Aug. 10, 1943. R. L. WILCOX 2,326,273
SHAFT DRIVING MECHANISM
Filed Feb. 2, 1942 5 Sheets-Sheet 1

INVENTOR
Richard Lester Wilcox
BY
ATTORNEY

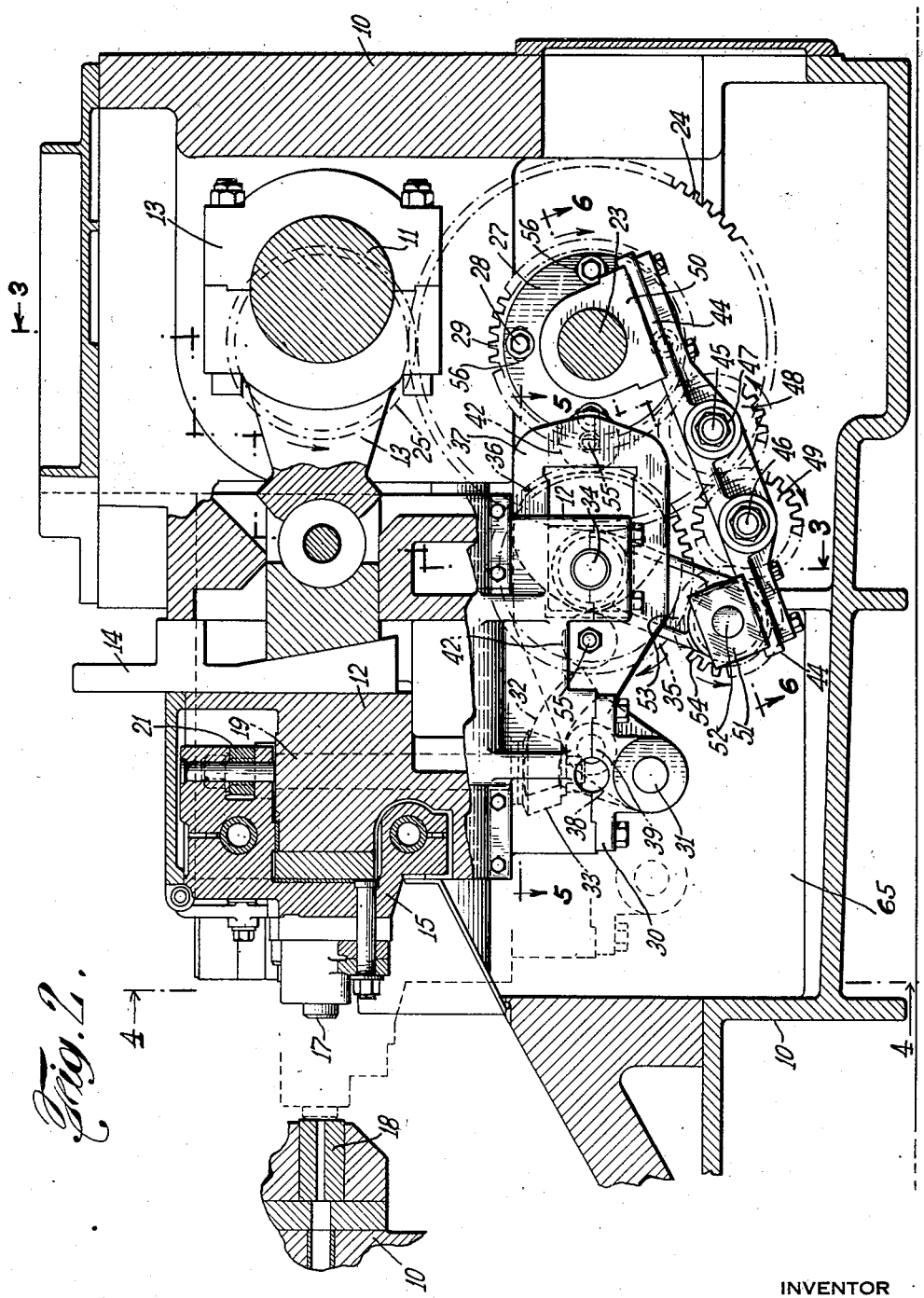

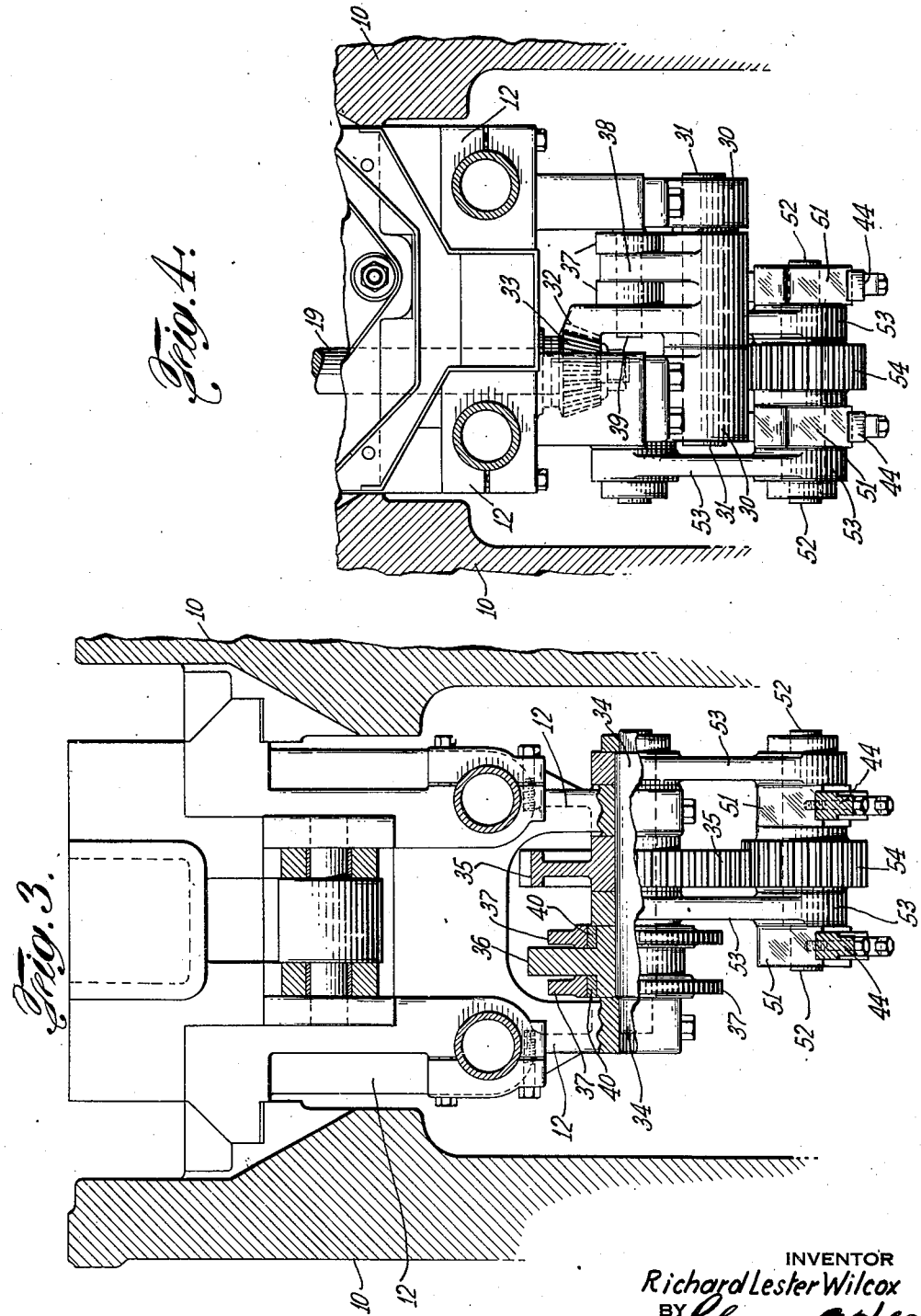

Aug. 10, 1943.  R. L. WILCOX  2,326,273
SHAFT DRIVING MECHANISM
Filed Feb. 2, 1942   5 Sheets-Sheet 4
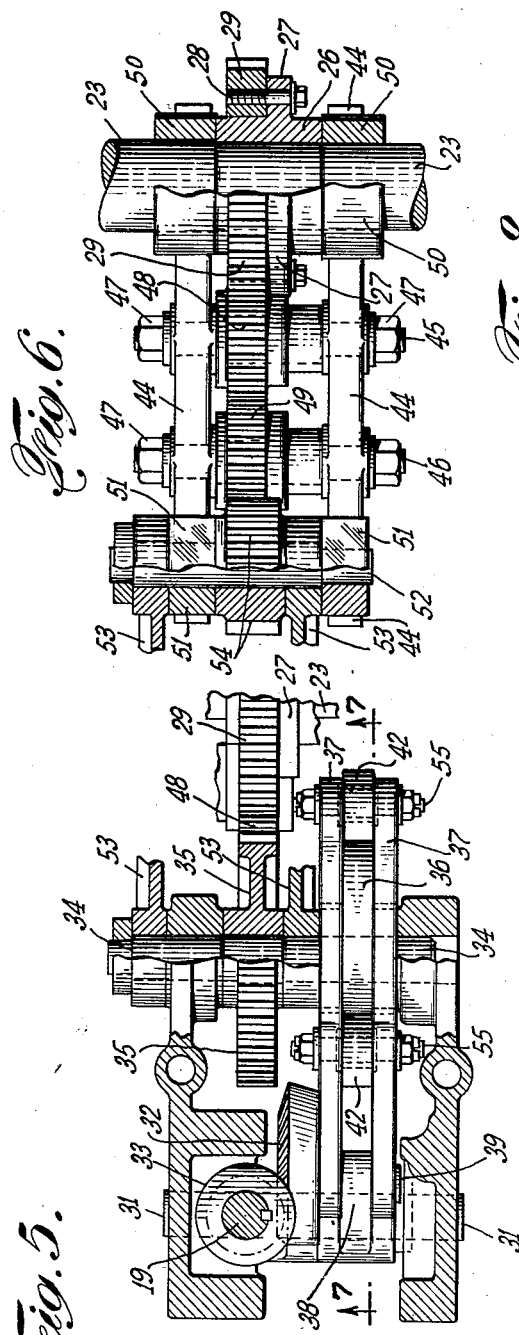
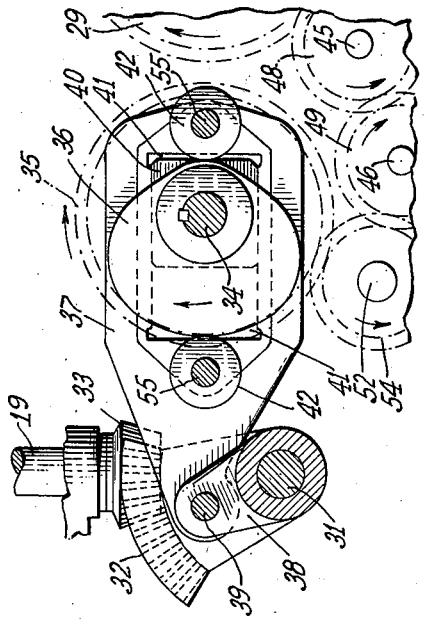
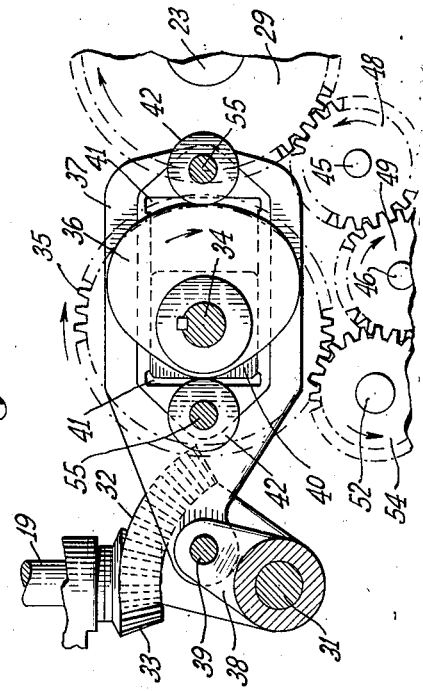
INVENTOR
Richard Lester Wilcox
BY
ATTORNEY Aug. 10, 1943.   R. L. WILCOX   2,326,273
SHAFT DRIVING MECHANISM
Filed Feb. 2, 1942   5 Sheets-Sheet 5
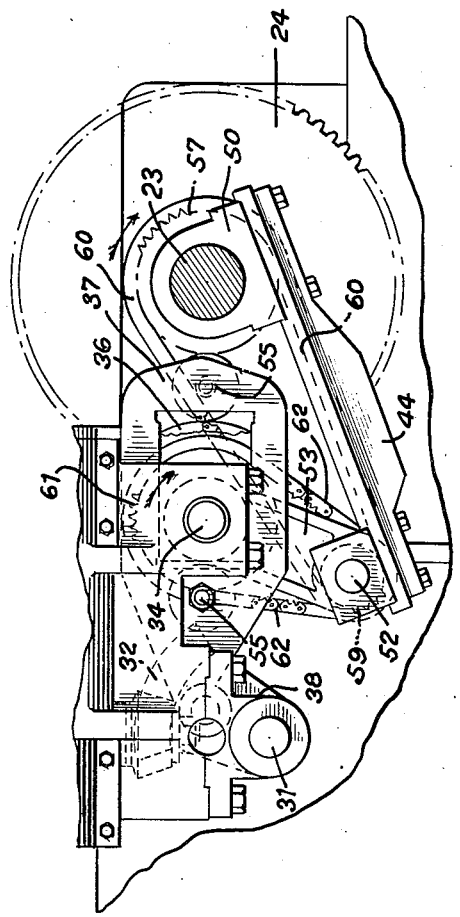
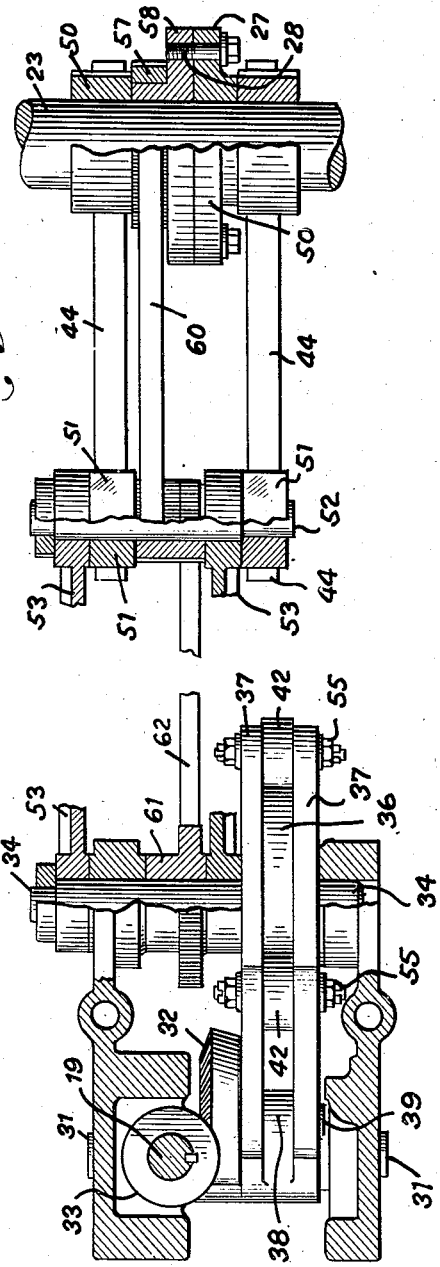
INVENTOR
Richard Lester Wilcox
BY
ATTORNEY Patented Aug. 10, 1943

2,326,273

UNITED STATES PATENT OFFICE 2,326,273

SHAFT DRIVING MECHANISM

Richard Lester Wilcox, Waterbury, Conn., assignor to The Waterbury Farrel Foundry and Machine Company, Waterbury, Conn., a corporation of Connecticut Application February 2, 1942, Serial No. 429,243

22 Claims. (Cl. 10—12)

This invention relates to new and improved shaft driving mechanism, particularly as applied to mechanism for driving a shaft that is journaled in and movable with a reciprocating element. It is described and illustrated herein as applied to a header or upsetting machine, wherein an oscillating shaft is journaled in the movable gate of such machine.

A principal object of the invention is to provide simple and effective mechanism for imparting movement to a shaft in the gate of a header, upsetting machine or the like during its travel and in timed relation with other parts.

Another object of the invention is to provide a positively driven mechanism that will shift the punch carrier of a header, upsetting machine or the like, without the requirement of compensating devices, spring connections or the like, conventionally used to accommodate the stop adjustments, and to so construct the device that it may be immersed and move in a lubricant.

A further object is to arrange the punch carrier shifting mechanism, whereby it is contained within the header gate and consequently there are no forces in any direction to wear, distort or deflect the gate when the punch carrier is shifted.

Other objects will be apparent from the following description and the accompanying drawings.

To these ends, the invention consists in the shaft driving mechanism having certain details of construction and combinations of parts, as will be hereinafter described and more particularly pointed out in the claims.

In the drawings, wherein like numerals of reference indicate like parts in the several figures:

Figure 2 is a fragmentary sectional view thereof, the parts in section being taken generally upon line 2—2 of Figure 1;

Figure 3 is a transverse sectional view thereof, the parts in section being taken upon line 3—3 of Figure 2;

Figure 4 is a similar view, the parts in section being taken generally upon line 4—4 of Figure 2;

Figure 5 is a fragmentary sectional plan view thereof, the parts in section being taken generally upon line 5—5 of Figure 2;

Figure 6 is a similar view, the parts in section being taken generally upon line 6—6 of Figure 2;

Figure 7 is a fragmentary sectional view of some of the parts thereof, those in section being taken generally upon line 7—7 of Figure 5;

Figure 8 is a view similar to Figure 7, with some of the parts shown in different relative positions;

Figure 9 is a view of an alternative form of mechanism arranged for a sprocket and chain drive;

Figure 10 is a fragmentary sectional plan view similar to Figure 5, arranged for a sprocket and chain drive; and Figure 11 is a fragmentary sectional view of Figure 6 of mechanism also having a sprocket and chain drive.

Figure 1:
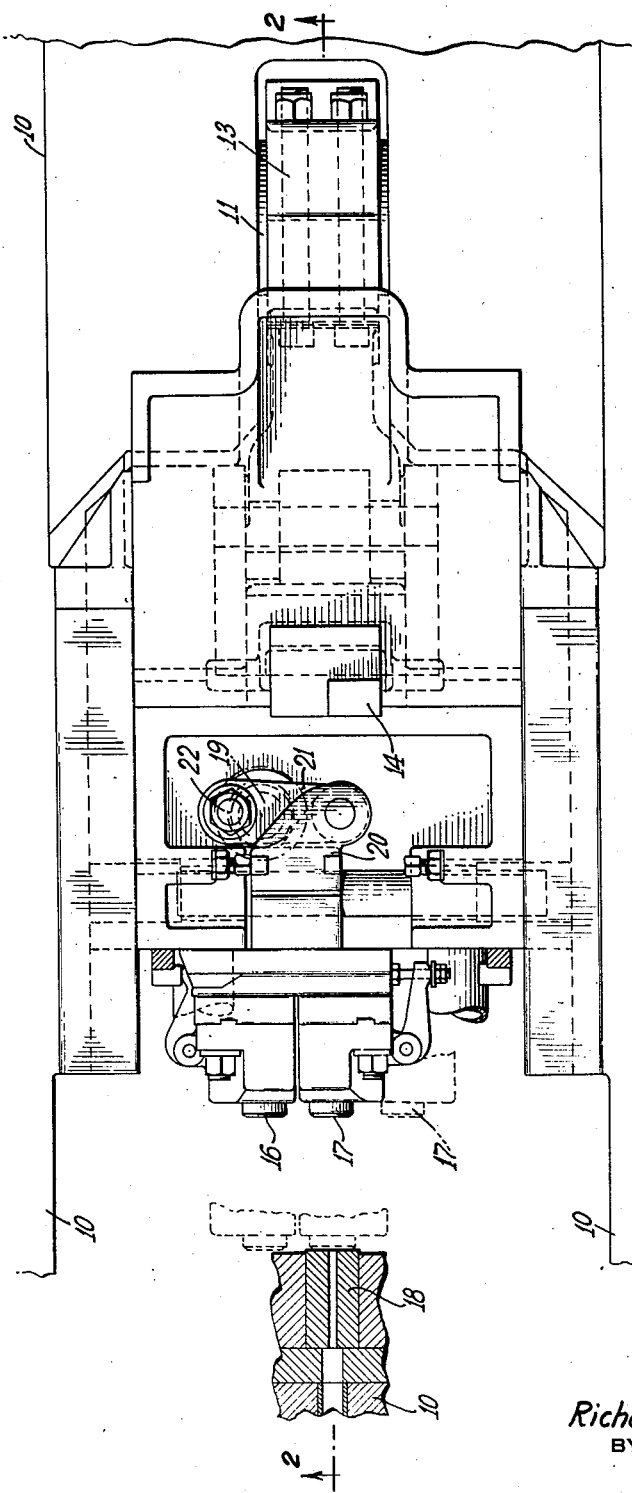
Figure 1 is a fragmentary plan view of a portion of a header, upsetting machine or the like, with the improved shaft driving mechanism associated therewith.

In the drawings, 10 indicates the frame of a heading or upsetting machine or the like; 11 the crank shaft which is rotatable thereon about a fixed axis; 12 the gate that is reciprocated in the frame by the crank shaft 11, through the pitman 13, and 14 is the wedge common to this type of machine.

On the front face of the gate is a carrier slide 15 having associated therewith the punches 16 and 17. These punches cooperate with a die fixed in a part of the frame 10 to fabricate a workpiece therebetween in a well known manner. Movement of the carrier slide 15 on the gate is accomplished through a shaft 19 journaled to oscillate in the gate connected by a link 21 with a lug 20 on the carrier slide having a crank 22 at one end connected with the shaft 19.

The invention herein relates particularly to the means for oscillating said shaft 19 from the continuously rotating crank shaft 11. Journaled in the frame 10 is a shaft 23, on which is a gear 24, the teeth of which mesh into those of a pinion 25 on the crank shaft 11. Secured to the shaft 23 is a sleeve 26 having a flange 27, through which are a plurality of arcuate slotted holes 56. Bolts 28 pass through these slots threaded into gear 29. The rotary adjustment of the gear 29 with respect to the shaft 23 provides means for varying the timing of the parts. Journaled on the blocks 30 secured to the gate 12 is a rock shaft 31 having fixed thereon a sector gear 32, the teeth of which mesh into those of a beveled pinion 33 fixed on the oscillating shaft 19.

Between the rock shaft 31 and shaft 23 and journaled in the gate 12 is a shaft 34, having a gear 35 and a cam 36 fixed thereon. Upon each side of the cam 36 and connected with an arm 38 on the hub of sector gear 32 by a pin 39 is a slide 37. Each slide is supported by and moves upon a block 40 journaled on the shaft 34 and within a rectangular opening 41 in the slide. Rotatably connected with and between the slides are the cam rolls 42, which are in contact with the face of the cam 36.

A gear frame is constructed in part with two substantially parallel rail members 44, held in spaced relation to each other by stationary shafts 45 and 46, secured in position by the nuts 47. Upon the shaft 45 is an idler gear 48 and upon shaft 46 an idler gear 49, the teeth of which mesh into each other. Fixed at one end of each rail member 44 is a frame block 50 journaled upon the shaft 23 and a frame block 51 at the other end. In this latter block is fixed a shaft 52, upon which is journaled one end of each of a pair of swivel links 53, the opposite ends thereof being fixed on the shaft 34. Rotatable upon this shaft 52 is a pinion 54, the teeth of which mesh into those of the gear 35 on the shaft 34. The links 53 maintain the center to center distance between the gear 35 and pinion 54.

The shafts 31 and 34 being journaled in the gate 12 reciprocate therewith. The cam actuated slides 37 impart a rocking movement to the sector 32 and an oscillating movement to the shaft 19. Rotary motion is always transmitted to the shaft 34 from the crank shaft through the gears and pinions 25, 24, 29, 48, 49, 54 and 35, the links 53 maintaining the proper relative position between the pinion 54 and the gear 35 during the entire reciprocation. The reciprocatory and rotary motion of the gear 35 imparts a slight rocking movement to the gear frame about the axis of shaft 23 to accommodate the varying positions of the shafts 31 and 34 in respect thereto. In Figure 2 the position of the parts when the gate is in its rearmost position, that is, most distant from the fixed die 18, is illustrated by full lines and their forward position by dotted lines. In Figure 7 the cam 36 and immediately associated parts are illustrated in the relative position occupied by them when punch 17 is in alignment with the die 18, and in Figure 8 the same parts when the punch 16 is in alignment with the die 18. Thus, as the gate reciprocates within the frame, moving the punches toward and away from the fixed die, the carrier slide is moved endwise on the face of the gate and the punches 16 and 17 are successively moved into register with the die 18 through the oscillation of the shaft 19, crank 22 thereon, and the link 21.

With a lubricant within the chamber 65 in the frame 10, all of the mechanism hereinbefore described and below the gate is immersed and moves therein.

As the diameter and number of teeth in the gears 29 and 35 are the same, the speed of rotation of the shafts 23 and 34 is the same. The axis of shaft 23 is permanent relative to the frame and shaft 34 permanent relative to the gate. Shaft 34 reciprocates a distance equal to the stroke of the crank shaft 11, giving the required oscillation to the shaft 19, whereby to shift the carrier slide 15 transversely on the face of gate 12. The action of cam 36 is such that the shaft 19 is oscillated approximately 180°.

It is desirable to shift the punches and hold the same in their shifted positions in approximately 90° or one-fourth revolution of the shaft 23 and then dwell for approximately 90° or the succeeding one-fourth revolution of the shaft 23. Inasmuch as shaft 23 makes only one complete revolution to two revolutions of the crank shaft 11 and two strokes of the gate 12, the result is a timing on the crank shaft 11 of 180° for shifting the positions of the punches and 180° dwell, or when there is no relative motion of the carrier slide 15 on the gate.

The cam 36 rotates 120° to give 90° shifting time on the shaft 23 and a dwell of 60° on the cam 36 gives 90° dwell on the shaft 23. This is caused by the reciprocating travel of the shaft 34 with the gate, plus the direction of travel of the gear 35 and pinion 54. The center of shaft 52 is substantially stationary, although it rocks on shaft 23 with a minimum up and down motion resulting from travel of shaft 34 in a straight path.

In Figure 2 the gate 12 is illustrated in its rear position and the carrier slide 15 at a dwell position which it retains during the full forward stroke of the gate and first portion of the return stroke. As the gate 12 moves forward with the shaft 34, gear 35 thereon, and associated parts, the shaft 52 is substantially stationary. Therefore, the combination of the speed and direction of rotation of pinion 54 (anti-clockwise), and the gear 35 (clockwise), with the gate swinging the links 53 around the center of shaft 52, is such that the gear 35 and cam 36 stand still for a portion of the forward travel of the gate 12. The rotation of the gear 35 being clockwise, and the peripheral speed being equal to that of the forward travel of the shaft 34, no rotation or motion is imparted to the gear 35 at this time. Consequently, the 60° dwell on the cam 36 results in a 90° timing for the dwell of the carrier slide 15. Likewise, when the gate 12 is returning from its forward position opposite conditions prevail and the speed of gear 35 and cam 36 is accelerated so that the shifting motion of cam 36 is 120°, resulting in a 90° timing for the motion of shifting the carrier slide 15. The above described timing is based on the revolutions of the shaft 23. A sprocket and chain drive between the shafts 23 may be substituted for the train of gears, the ratio of speeds and timing remaining the same. Figures 9, 10 and 11 are views of such sprocket and chain mechanism. Referring to these figures—57 is a sprocket gear fixed on the hub of a plate 58 that is adjustable on the flange 27. A wide face sprocket pinion 59 is rotatable on the shaft 52 and connected with the sprocket gear 57 by a sprocket chain 60. On the shaft 34 is fixed a sprocket gear 61, which is connected with the pinion 59 by a sprocket chain 62. Power is transmitted from the shaft 23 to the shaft 34 by the sprocket chains 60 and 62.

The invention is not limited to any specific construction, arrangement or form of the parts, as it is capable of numerous modifications and changes within the scope of the appended claims.

What is claimed is:

1. In combination with a reciprocating element; a slide independently movable thereon and transversely thereof, a shaft journaled in the reciprocating element perpendicular to the path of movement thereof; a shaft journaled in a fixed part; means between the shafts for imparting an oscillating movement to the shaft in the reciprocating element; and means between the slide and the first named shaft for imparting movement to the slide.

2. In combination with a reciprocating element; a slide independently movable thereon and transversely thereof, a shaft journaled in the reciprocating element perpendicular to the path of movement thereof; a shaft journaled in a fixed part; gear means between the shafts for imparting an oscillating movement to the shaft in the reciprocating element; and means between the slide and the first named shaft for imparting movement to the slide.

3. In combination with a reciprocating element; a shaft journaled therein; a pinion thereon; a gear on the reciprocating element having a meshing engagement with the teeth of the pinion; and means for rocking said sector gear in timed relation with the movement of the reciprocating element whereby to oscillate the shaft therein.

4. In combination with a reciprocating element; a shaft journaled therein; a pinion thereon; a gear on the reciprocating element having a meshing engagement with the teeth of the pinion; and means for rocking said gear in timed relation with the movement of the reciprocating element whereby to oscillate the shaft therein, comprising in part reciprocating mechanism actuating the sector gear.

5. In combination with a reciprocating element; a shaft journaled therein; a pinion thereon; a gear on the reciprocating element having a meshing engagement with the teeth of the pinion; and means for rocking said gear in timed relation with the movement of the reciprocating element whereby to oscillate the shaft therein, comprising in part reciprocating mechanism actuating the gear, and gear driven means for actuating the reciprocating mechanism.

6. The combination with a gate; of a shaft journaled therein perpendicular to the path of movement of the gate; a slide on the gate; a shaft journaled in a fixed part; mechanism between the last mentioned shaft and gate for imparting a reciprocatory movement thereto; mechanism between said last mentioned shaft and the first mentioned shaft for imparting an oscillating movement thereto; and means between the slide and the first named shaft for imparting movement to the slide.

7. In combination with a reciprocating element; a slide thereon; a shaft journaled in the reciprocating element perpendicular to the path of movement thereof; a shaft journaled in a fixed part; means between the shafts for imparting an oscillating movement to the shaft in the reciprocating element, comprising in part a frame, a train of gears carried by the frame, and a connection between the reciprocating element and the frame, whereby a rocking movement is imparted to the frame; and means between the slide and the first named shaft for imparting movement to the slide.

8. In combination with a reciprocating element; a slide thereon; a shaft journaled in the reciprocating element perpendicular to the path of movement thereof; a shaft journaled in a fixed part; a gear thereon; means between the shafts for imparting an oscillating movement to the shaft in the reciprocating element, comprising in part a frame, a train of gears carried by the frame, and a connection between the reciprocating element and the frame, whereby a rocking movement is imparted to the frame, said train of gears being driven from said gear; and means between the slide and the first named shaft for imparting movement to the slide.

9. In combination with a reciprocating element; a slide thereon; a shaft journaled in the reciprocating element perpendicular to the path of movement thereof; a shaft journaled in a fixed part; means between the shafts for imparting an oscillating movement to the shaft in the reciprocating element, comprising in part companion rock shafts journaled in the reciprocating element; an operative connection between the rock shafts; a frame carrying a train of gears; and means connected with one of said rock shafts for imparting a rocking movement to the said frame during the reciprocation of said element.

10. A reciprocating gate; a shaft journaled therein perpendicular to the path of movement of the gate; a frame journaled upon a member having a fixed axis; a train of gears carried by the frame; companion rock shafts in the gate; a gear upon one of said rock shafts, the teeth of which mesh into the teeth of one of said train of gears; mechanism for actuating one of said rock shafts from the other rock shaft; and a connection between one of said rock shafts and said frame, whereby during its travel with the gate it will rock said frame, and the train of gears thereon will maintain their intermeshing engagement with each other.

11. In combination with a reciprocating element; a shaft journaled therein perpendicular to the path of movement of the reciprocating element; a shaft journaled in a fixed part; and means between the shafts for imparting an oscillating movement to the shaft in the reciprocating element, comprising in part companion rock shafts journaled in the reciprocating element, a crank arm on one rock shaft, a reciprocating member connected with the crank arm, and cam means connected with the other rock shaft for imparting movement to the said reciprocating member.

12. In combination with a reciprocating element; a shaft journaled therein perpendicular to the path of movement of the reciprocating element; a shaft journaled in a fixed part; means between the shafts for imparting an oscillating movement to the shaft in the reciprocating element, comprising in part companion rock shafts journaled in the reciprocating element, a crank on one rock shaft, a reciprocating member connected with the crank arm, and cam means connected with the other rock shaft for imparting movement to the said reciprocating member; and gear means between the last mentioned rock shaft and the said shaft journaled in the fixed part for rotating the rock shaft, a portion of the gear means being rotatable about a movable axis.

13. In combination with a reciprocating element; a shaft journaled therein perpendicular to the path of movement of the reciprocating element; a shaft journaled in a fixed part; and means between the shafts for imparting an oscillating movement to the shaft in the reciprocating element, comprising in part a frame, a train of gears, and a connection between the reciprocating element and the frame, whereby a rocking movement is imparted to the frame; and means for holding two of the gears with their centers constant with respect to each other during the travel of one of the gears about the axis of the other gear.

14. In combination with a reciprocating element; a shaft journaled therein perpendicular to the path of movement of the reciprocating element; a shaft journaled in a fixed part; and means between the shafts for imparting an oscillating movement to the shaft in the reciprocating element, comprising in part a frame; a train of gears, one having a substantially straight line movement with the reciprocating element, and another moving upon an axis concentric with the last mentioned gear; and means for maintaining the space between the centers of the two last mentioned gears during the travel of one about the axis of the other.

15. In combination with a reciprocating element; a shaft journaled therein perpendicular to the path of movement of the reciprocating element; a shaft journaled in a fixed part; and sprocket and chain means between the shafts for imparting an oscillating movement to the shaft in the reciprocating element.

16. In combination with a reciprocating element; a shaft journaled therein perpendicular to the path of movement of the reciprocating element; a shaft journaled in a fixed part; and means between the shafts for imparting an oscillating movement to the shaft in the reciprocating element, comprising in part a frame mounted for limited oscillation, one or more gears rotatable relative to the frame, a sprocket chain between said shafts journaled in a fixed part, said gears and sprocket chain forming part of the driving mechanism between said gears and first mentioned shaft.

17. In combination with a reciprocating element; a slide thereon; a shaft journaled in the reciprocating element perpendicular to the path of movement thereof; a shaft journaled in a fixed part; a gear thereon; and means between the shafts for imparting an oscillating movement to the shaft in the reciprocating element, comprising in part a frame, power transmission mechanism carried by the frame, and a connection between the reciprocating element and the frame.

18. In combination with a reciprocating element; a slide thereon; a shaft journaled in the reciprocating element perpendicular to the path of movement thereof; a shaft journaled in a fixed part; means between the shafts for imparting an oscillating movement to the shaft in the reciprocating element, comprising in part companion rock shafts journaled in the reciprocating element; an operative connection between the rock shafts; a frame carrying one or more gears; and means connected with one of said rock shafts for imparting a rocking movement to the said frame during the reciprocation of said element.

19. In combination with a reciprocating gate; a punch carrier movably associated with the gate; and means for moving the punch carrier in a reciprocatory path relative to the gate, comprising in part a shaft journaled within the gate perpendicular to the path of movement thereof; a link connection between the shaft and gate; and means movable in part with the gate for actuating the shaft, comprising in part a cam, a connection between the cam and shaft, whereby a dwell of the cam will produce an increased dwell of the punch carrier.

20. The combination with a reciprocating element; a shaft journaled therein perpendicular to the path of movement of the reciprocating element; a second shaft journaled in the reciprocating element with its axis at an angle to that of the perpendicular shaft; an operative connection between said shafts, whereby movement of the latter will be transmitted to the former; a rotatable cam member; and a connection between the rotatable cam member and the second rock shaft; and means for actuating the cam whereby the dwell thereof results in an increased dwell of the punch carrier in timed relation to the movement of the reciprocating element.

21. In mechanism of the character described, the combination with a frame or body, having a lubricant chamber forming part thereof; a reciprocating gate in the frame; a shaft journaled therein perpendicular to the gate; a journaled frame; a train of gears carried by the journaled frame; companion shafts in the gate; a gear upon one of the companion shafts, the teeth of which mesh into the teeth of one of said train of gears; mechanism for actuating one of said companion shafts from the other companion shaft; and a connection between one companion shaft and the journaled frame, whereby during its travel with the gate it will actuate said journaled frame, and the train of gears thereon will maintain their intermeshing engagement with each other, said journaled frame and train of gears being within the lubricant in said lubricant chamber.

22. In mechanism of the character described, the combination with a frame or body; a gate therein; a shaft in the frame or body; mechanism between the shaft and gate to reciprocate the gate; a shaft journaled in the gate perpendicular to its path of movement; a slide independently moveable on the gate transversely thereof; an operative connection between the last mentioned shaft and the slide; means between the first mentioned shaft and the shaft in the gate, whereby the slide is moved upon the gate for a portion of the revolution of the shaft and dwells for another portion of the movement thereof.

RICHARD LESTER WILCOX.